(12) United States Patent
Baur

(10) Patent No.: US 8,496,827 B2
(45) Date of Patent: *Jul. 30, 2013

(54) WASTE ACTIVATED SLUDGE PHOSPHORUS AND MAGNESIUM STRIPPING PROCESS AND STRUVITE PRODUCTION SYSTEM

(75) Inventor: Robert James Baur, Lake Oswego, OR (US)

(73) Assignee: Clean Water Services, Hillsboro, OR (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/451,168

(22) PCT Filed: Feb. 2, 2009

(86) PCT No.: PCT/US2009/000689
§ 371 (c)(1),
(2), (4) Date: Mar. 10, 2010

(87) PCT Pub. No.: WO2009/097160
PCT Pub. Date: Aug. 6, 2009

(65) Prior Publication Data
US 2010/0170845 A1    Jul. 8, 2010

Related U.S. Application Data

(63) Continuation of application No. 12/012,362, filed on Feb. 1, 2008, now Pat. No. 7,604,740.

(51) Int. Cl.
*C02F 11/04* (2006.01)
*C02F 3/30* (2006.01)

(52) U.S. Cl.
USPC .................. 210/609; 210/630; 210/906

(58) Field of Classification Search
USPC ............ 210/603, 608, 609, 630, 206, 252, 210/259, 906
See application file for complete search history.

(56) References Cited

U.S. PATENT DOCUMENTS 5,360,546 A    11/1994  Tomita et al.
6,464,875 B1   10/2002  Woodruff
(Continued)

FOREIGN PATENT DOCUMENTS

JP    7-88500 A    *   4/1995
JP    09-262599         10/1997
(Continued)

OTHER PUBLICATIONS

Canadian Patent App. No. 3797225; Office Action dated May 17, 2011 (4 pgs).
(Continued)

*Primary Examiner* — Fred Prince
(74) *Attorney, Agent, or Firm* — Ater Wynne LLP

(57) ABSTRACT

A method of treating a mixture of microorganisms with readily biodegradable carbon compounds (RBCs) in the form of one or more volatile fatty acids (VFAs), by first inducing the mixture microorganisms to release phosphorus and magnesium which is then tapped o as the mixture is thickened, to produce a phosphorus/magnesium-nch liquid and a phosphorus/magnesium-reduced treated mixture This treated mixture is placed in an anaerobic digester where ammonia is formed, but combines very little with phosphorus or magnesium Next the high-ammonia mixture is dewatered to produce an ammonia-rich liquid, which is combined with the phosphorus and magnesium-rich liquid and reacted to form struvite In one preferred embodiment, VFAs are formed in situ via an upstream unified fermentation and thickening (UFAT) process and added to the waste sidestream to strip phosphorus and magnesium found therein In another preferred embodiment a usable struvite product is harvested.

37 Claims, 4 Drawing Sheets

U.S. PATENT DOCUMENTS

| | | |
|---|---|---|
| 6,663,777 B2 | 12/2003 | Schimel |
| 6,706,185 B2 | 3/2004 | Goel et al. |
| 6,776,816 B1 | 8/2004 | Ringelberg et al. |
| 7,264,715 B2 | 9/2007 | Hagino et al. |
| 7,604,740 B2 | 10/2009 | Bauer |
| 2001/0045390 A1 | 11/2001 | Kim et al. |
| 2003/0172697 A1 | 9/2003 | Sower |
| 2003/0217968 A1 | 11/2003 | Goel et al. |
| 2006/0124541 A1 | 6/2006 | Logan et al. |
| 2007/0000836 A1 | 1/2007 | Elefritz |
| 2007/0209998 A1 | 9/2007 | Abu-Orf |

FOREIGN PATENT DOCUMENTS

| | | |
|---|---|---|
| JP | 2003-334584 | 11/2003 |
| JP | 2004160343 | 10/2004 |
| JP | 2005-161158 | 6/2005 |
| RU | 2454374 | 6/2012 |

OTHER PUBLICATIONS

China Patent App. No. CN200980101401.3; Office Action dated Aug. 31, 2011 (13 pgs).
Russia Patent App. No. 20101226650; Office Action dated Jun. 14, 2011; (5 pgs).
Russia Patent App. No. 20101226650; Response to Office Action dated Aug. 30, 2011; (4 pgs).
New Zealand Patent App. No. 586702; Examiner's Report dated Feb. 28, 2011 (2 pgs).
New Zealand Patent App. No. 586702; Response to Examiner's Report dated Jul. 25, 2011; (20 pgs).
Russia Patent App. No. 20101226650; Office Action dated Oct. 6, 2011; (5 pgs).
Montage et al (2007) A Feasible Approach of Integrating Phosphate Recovery as Struvite at Waste Water Treatment Plants; Proceedings,: Institute of Environmental Engineering, pp. 551-558; (8 pgs).
Rensink et al (1997), "The Modified Renphosystem: A High Biological Nutrient Removal System," Wat. Sci. Tech., vol. 35, No. 10, pp. 137-146 (10 pgs).
USEPA (1987), "Phosphorus Removal," Design Manual No. EPA/625/1-87/001, Center for Environmental Research Information, Cincinnati, OH, Chapter 3 (125 pgs).
International Search Report for Int'l Appl No. PCT/US09/00689; Int'l Searching Authority; Mar. 23, 2009 13 pages.
Canadian Patent App. No. 3797225; Response to Office Action of May 17, 2011 filed on Jan. 17, 2011 (14 pgs).
Canadian Patent App. No. 3797225; Office Action dated Apr. 24, 2012 (5 pgs).
Droste, (1997) Theory and practice of water and wastewater treatment, John Wiley & Sons, Inc. NY, pp. 589-591 (5 pgs).
China Patent App. No. 200980101401.3; Office Acton dated Feb. 13, 2012 (10 pgs).
China Patent App. No. 200980101401.3; Office Action dated Aug. 30, 2012 (8 pgs).
Canadian Patent App. No. 3797225; Response to Office Action of Apr. 24, 2012 filed on Oct. 24, 2012 (26 pgs).
English Translation of Office Action dated Jan. 15, 2013 from Japanese Patent Office (23 pgs).

* cited by examiner

WASTE ACTIVATED SLUDGE PHOSPHORUS AND MAGNESIUM STRIPPING PROCESS AND STRUVITE PRODUCTION SYSTEM

RELATED APPLICATIONS

This application is a continuation of and claims the benefit of priority to U.S. Non-Provisional application Ser. No. 12/012,362 filed on Feb. 1, 2008 now U.S. Pat. No. 7,604,740 and entitled WASTE ACTIVATED SLUDGE STRIPPING TO REMOVE INTERNAL PHOSPHORUS, the contents of which is hereby incorporated herein in its entirety by this reference.

FIELD OF THE INVENTION

The invention relates generally to the field of "waste-activated sludge" (WAS) stripping. More particularly, the invention relates to adding readily biodegradable carbon compounds (RBCs) to biological sludge to reduce downstream struvite build-up in a digester and to produce a usable struvite product therefrom.

BACKGROUND OF THE INVENTION

As part of secondary sewage treatment, primary treated sewage is treated with air or pure oxygen. In what is termed the "activated sludge" process, microorganisms utilize the oxygen to metabolize the incoming waste sewage, forming a mixture of microorganisms and sewage known as "mixed liquor." This mixture is moved to settling tanks for concentration, thereby forming concentrated activated sludge. A majority of this sludge is returned to the activated sludge process tankage. A separate portion of this sludge, termed waste-activated sludge (WAS), is removed from the activated sludge process and sent to a sludge handling system for further treatment and disposal. In a stable system, the daily WAS is equal to the daily conversion of sewage into microorganisms so no net increase in mixed liquor bio-mass occurs. By manipulating the activated sludge process, phosphorus and magnesium are removed from the liquid stream and concentrated in the mixed liquor. The process is known as Enhanced Biological Phosphorus Removal (EBPR).

Referring to FIG. 1, in one typical scheme 10, the WAS is sent to a centrifuge (or other thickening apparatus) 14 for thickening, the liquids are tapped off and returned to the wastewater plant for treatment, whereas the resultant thickened sludge is sent to an anaerobic digester 16 with other sludges, where it remains for 15 days or more before being sent to a second centrifuge (or other dewatering apparatus) 18 for dewatering.

Unfortunately, struvite tends to form in digester 16, and other equipment downstream because of the ammonia, magnesium and phosphorus that are present can precipitate as struvite. This struvite is impractical to harvest and also has the deleterious effect of being deposited on surfaces in the reactor 16 and plugging pipes and equipment leading from the reactor.

A further centrifuge (or other dewatering apparatus) 18 produces further dewatered sludge 20, which is either beneficially reused or disposed of, and liquids 22, which are rich in ammonia and phosphorus. It has been learned that prilled struvite can be harvested from liquids 22, by a struvite reactor 24. This prilled struvite is a marketable product that can be used as a timed release fertilizer, thereby defraying some of the costs of sewage treatment. Unfortunately, the struvite harvest requires the addition of magnesium into the process, which forms a large part of the costs of the process and reduces the profitability.

In *A Feasible Approach of Integrating Phosphate Recovery as Struvite at Waste Water Treatment Plants*, Proceedings, Institute Of Environmental Engineering, pp. 551-558 (2007), D. Montag, et al. describe a phosphate recovery system that effectively teaches away from the addition of one or more volatile fatty acids (VFAs) for phosphorous removal. They do so by teaching long retention times instead of the addition of external organic or inorganic acids. In *The Modified Renphosystem: A High Biological Nutrient Removal System*, Wat. Sci. Tech., Vol. 35, No. 10, pp. 137-146 (1997), J. H. Rensink, et al. describe a so-called modified Renpho system. They fail to teach the addition of VFAs as dosing agents to WAS, fail to teach magnesium as well as phosphate release/removal, fail to teach fermentation, fail to teach pH adjustment prior to mixing w/centrate, and fail to teach the use of a dewaterer in connection with a digester.

Neither of these articles nor any other known prior art publication teaches separation of a VFA-enabled reagent into a phosphorus-rich and magnesium-rich liquid stream to a struvite reactor for pelletized struvite production nor into a phosphorus-poor and magnesium-poor sludge stream to a digester to reduce nuisance struvite build-up therein.

SUMMARY

The present invention may take the form of a method of treating a first mixture of waste solids and microorganisms containing phosphorus and magnesium, by first inducing the mixture microorganisms to release phosphorus and magnesium which is then tapped off as the mixture is thickened, to produce phosphorus and magnesium-rich liquid and phosphorus and magnesium-reduced treated mixture. This treated mixture is placed in an anaerobic digester where ammonia is formed but combines very little with phosphorus or magnesium as these elements have been greatly reduced in concentration. Next the high-ammonia mixture is dewatered, to produce an ammonia-rich liquid, which is combined with the phosphorus and magnesium-rich liquid. In one preferred embodiment a useable struvite product is harvested from this combination.

Additionally, the production of nuisance struvite in the anaerobic digester is greatly reduced, in comparison with prior art waste treatment methods.

Systems and methods of practicing the present invention are shown in FIGS. 2, 3, and 2A and are described in the accompanying text, which should help to clarify the invention in its various embodiments.

DETAILED DESCRIPTION OF THE PREFERRED EMBODIMENTS

Figure 1:
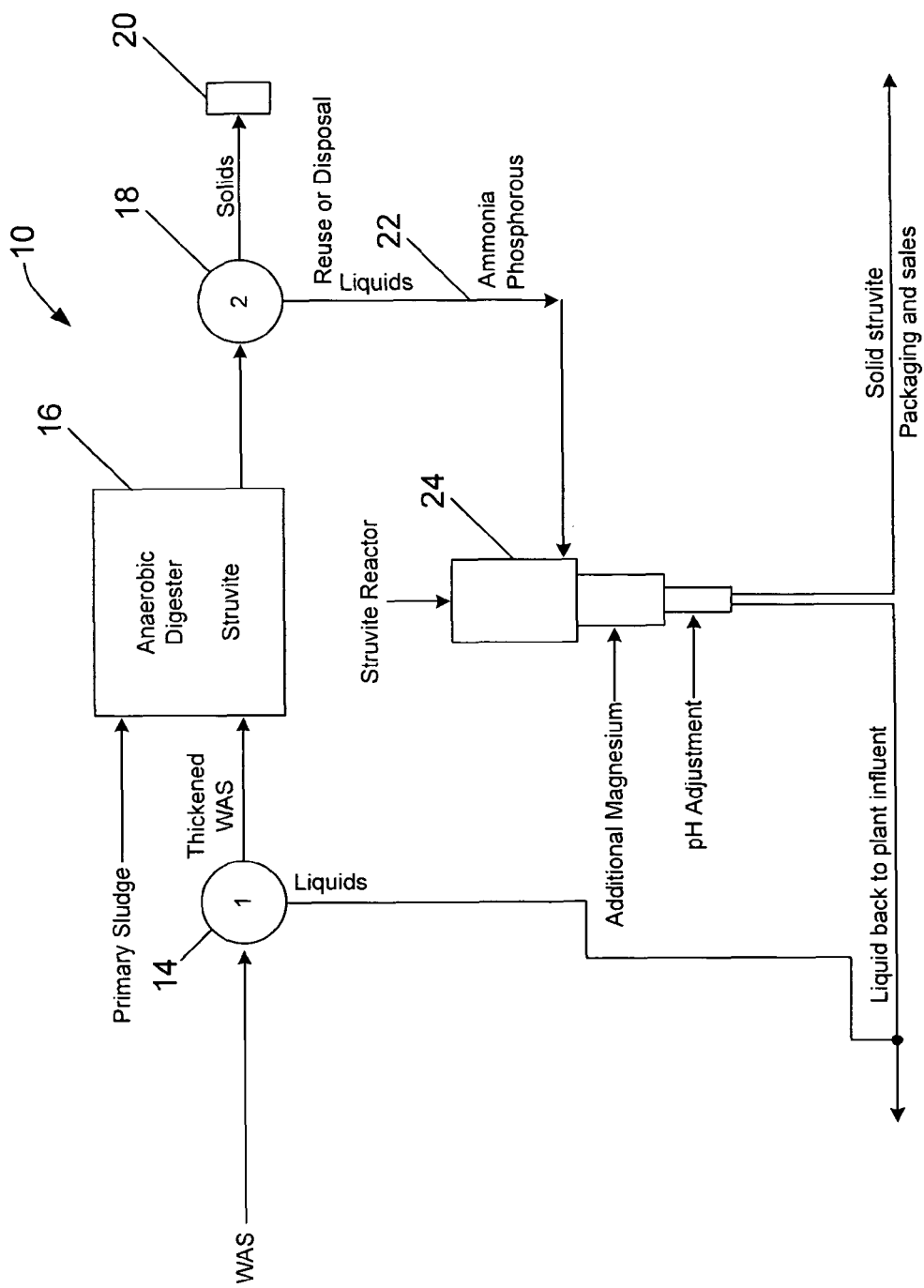
FIG. 1 is a block diagram of a prior art waste treatment system.
Figure 2:
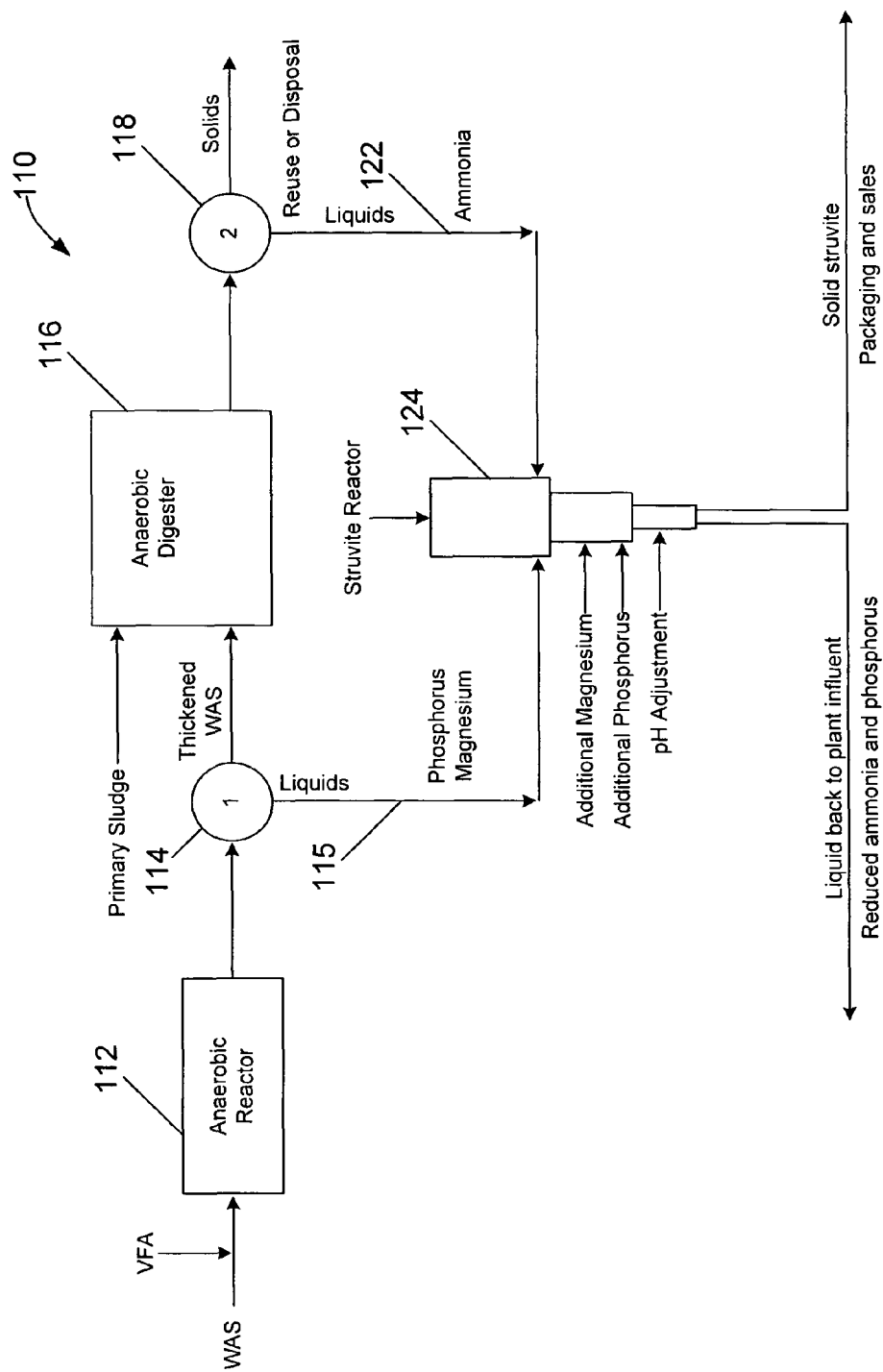
FIG. 2 is a block diagram of a waste treatment system according to the present invention.

Referring to FIG. 2, in a preferred embodiment of a waste activated sludge (WAS) treatment method 110, phosphorus and magnesium are released by microorganism action in an anaerobic reactor 112, where the WAS is held, for a minimum time of 0.5 hours. One method for effecting this release is by adding one or more readily biodegradable carbon compounds (RBCs), such as one or more volatile fatty acids (VFAs) to the sludge in the anaerobic reactor, with 3 to 8 grams (and preferably 4-6 grams) of the one or more VFAs added per gram of planned phosphorus release. In another technique, the activated sludge is held for 36 to 96 hours, without the addition of VFAs, for endogenous respiration and fermentation to release phosphorus and magnesium.

The resultant WAS is sent to a thickening device 114, such as a centrifuge, thickening belt or rotating screens and the resultant liquids 115, having enhanced phosphorus and magnesium levels, are sent to a struvite reactor 124, which will be discussed further below. There is only very minimal struvite production in the liquids 115, because they have a very low ammonia level. VFAs or other forms of RBCs can be generated by fermentation as in the unified fermentation and thickening (UFAT) process disclosed in U.S. Pat. No. 6,387,264 B1. Other methods of obtaining VFAs, include various fermentation methods, harvesting from various waste products and purchase as industrial chemicals, such as acetic acid.

The thickened WAS with reduced phosphorus and magnesium levels is sent to an anaerobic digester 116 with other sludges and is typically held there for a minimum of fifteen days, where it further treated by anaerobic bacteria which generate high concentrations of ammonia. The production of struvite in digester 116, is however, greatly reduced in comparison with the amount of struvite produced in digester 16 of the prior art system (which could be identical to digester 116) because of the reduction in phosphorus and magnesium in the thickened WAS, both of which are necessary for the formation of struvite. This reduction in struvite formation greatly reduces the formation of struvite deposits in the digester and pipes and equipment downstream from anaerobic digester 116.

The treated sludge from digester 116 is dewatered 118, by use of a centrifuge, dewatering belt, screen, plate and frame presses, etc. with the resultant dewatered solids being beneficially reused or disposed. The ammonia-rich liquids 122, which are less able to make struvite in the associated pipes and equipment because of the reduced phosphorus and magnesium, are sent to struvite reactor 124, where the abundant ammonia combines with the phosphorus and magnesium of the liquids 115 to form struvite.

Figure 3:
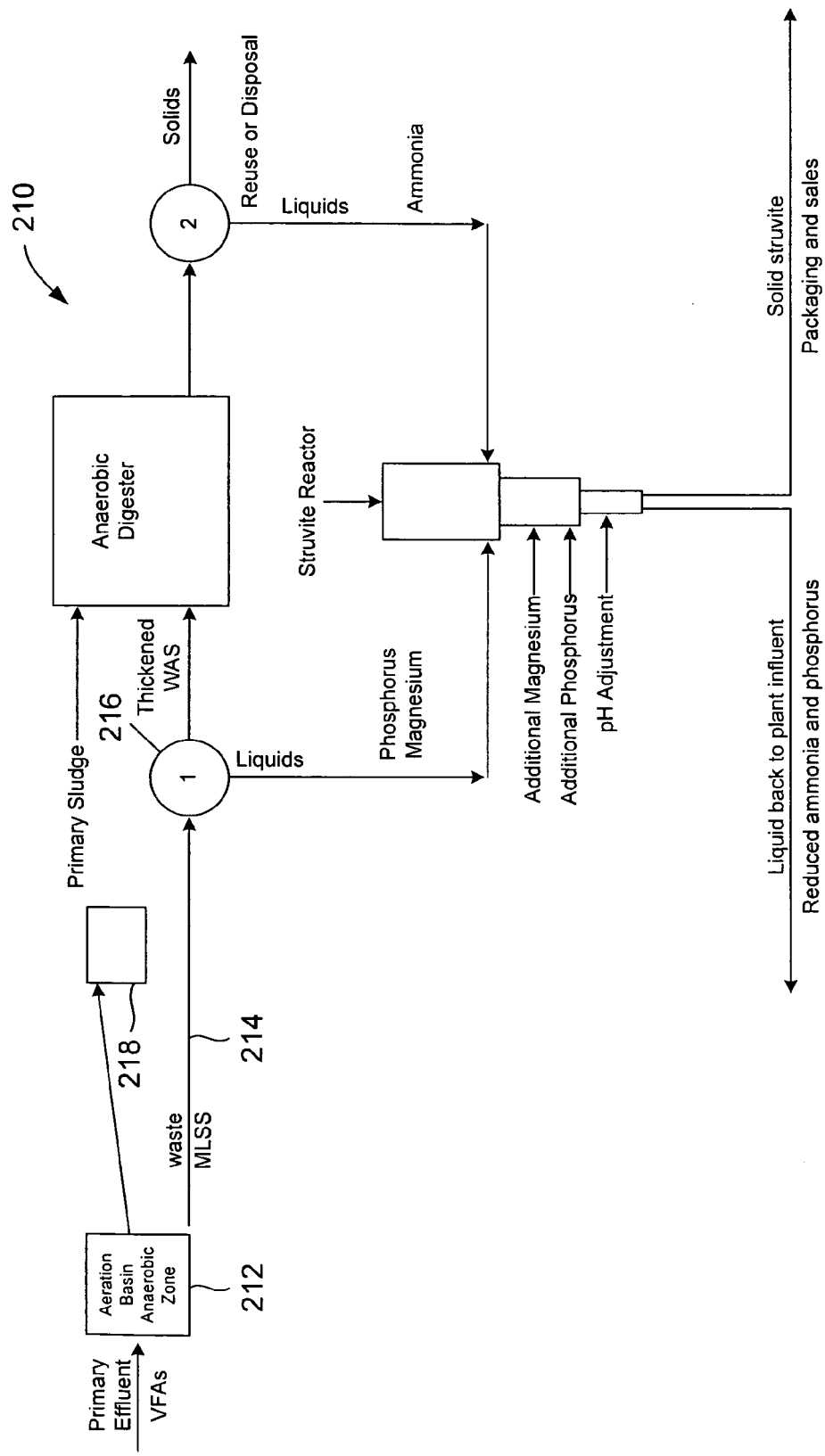
FIG. 3 is a block diagram of an alternative embodiment of a waste treatment system according to the present invention.

Referring to FIG. 3, in a second preferred embodiment, input to the system 210 is in the form of mixed liquor suspended solids (MLSS) 214 taken from the anaerobic zone 212 of the aeration basin, in an enhanced biological phosphorus removal (EBPR) system. The majority of the MLSS progresses to a further portion of the aeration basin 218. RBCs are added to the added to the MLSS in a standard EBPR system, thereby causing phosphorus and magnesium to be released from the microorganisms. Other than this difference the processing is largely the same, although some variation is necessary to accommodate the larger flow 214 into the thickener 216, as MLSS is typically three times as dilute as WAS. To handle the dilute flow, thickener 216 may utilize gravity thickening that is optionally followed by a belt or centrifuge or other thickening device. The anaerobic reactor 112 and supplemental addition of RBCs, shown in FIG. 2, can be eliminated.

Figure 2A:
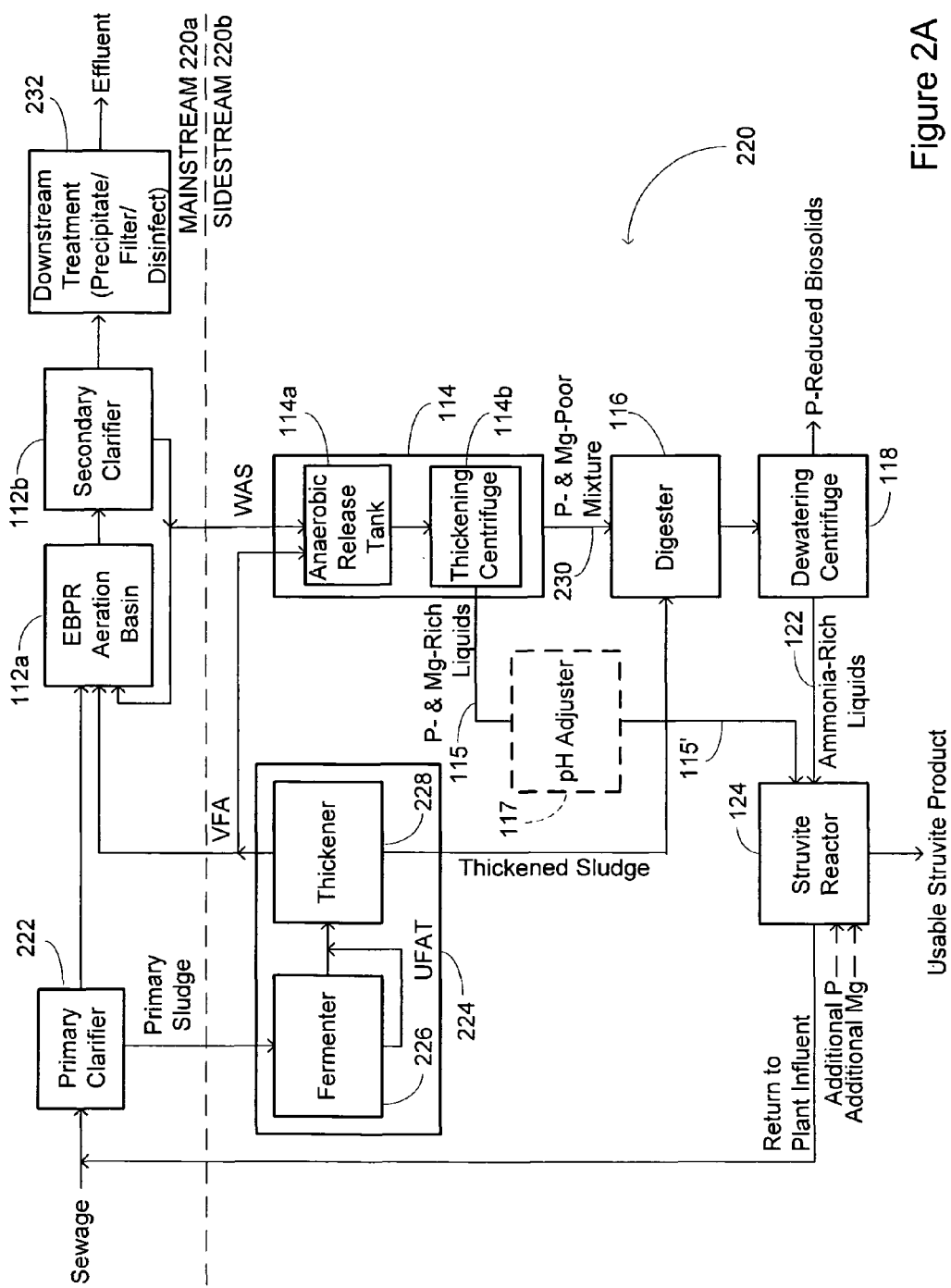
FIG. 2A is a block diagram of yet another embodiment of a waste treatment system according to the present invention.

FIG. 2A shows yet another embodiment of the invented system similar to that of FIG. 2 (and having identical reference designators for identical elements). System 220 may be seen to include a mainstream flow 220a and a sidestream flow 220b, as illustrated, respectively above and below the dashed horizontal line. System 220 is referred to herein as providing for the in situ, i.e. closed or contained, production of usable struvite byproduct (e.g. marketable products such as regularly or irregularly shaped and sized pellets or particles, non-marketable products such as struvite sludge, etc.) from WAS, without external inputs being required to realize the production process.

As will be understood, primary sludge contained in a primary clarifier 222 is processed through an UFAT 224 in accordance with U.S. Pat. No. 6,387,264 or an equivalent process that includes a fermenter 226 and a thickener 228 or combined fermenter/thickener that collectively process primary sludge into VFAs and a thickened sludge. The VFAs from UFAT 224 are inputted to an EBPR aeration basin 112a and to a separator/thickener 114 including, for example, an anaerobic release tank 114a and a second thickener such as a thickening centrifuge 114b. (Anaerobic reactor 112 of FIG. 2 in this alternative embodiment of the invention thus takes the form of an EBPR aeration basin 112a and a secondary clarifier 112b, as illustrated in FIG. 2A.)

The thickened sludge is fed to a digester 116, as shown in FIG. 2A. Either downstream from digester 116 at the struvite reactor (as described above by reference to FIG. 2) or upstream from digester 116, the pH of the P-rich and Mg-rich liquids is adjusted by a pH adjuster 117 (shown in dashed outline since it is optionally located in this upstream location instead of in struvite reactor 124). Those of skill in the art will appreciate that, despite adjusting the pH of the P-rich and Mg-rich liquids before they reach the struvite reactor nevertheless struvite does not form in the upstream pipe because no ammonia is present). Moreover, peak concentrations of the fluids in the downstream struvite reactor are reduced. In this way, optionally upstream-located pH adjuster 117 produces a pH-adjusted phosphorus-rich and magnesium-rich liquids stream 115' as an input to struvite reactor 124. (Thus, upstream pH adjuster 117 provides a system 220 topology that is more cost-effective and straightforward than the system 110 topology described above by reference to FIG. 2 wherein pH adjustment is performed in the struvite reactor.)

A separator/thickener 114 acts to separate the WAS input from a secondary clarifier 112b downstream from EBPR aeration basin 112a and the VFA input from UFAT 224 into two distinct output streams. A first relatively phosphorus-rich and magnesium-rich (P- & Mg-Rich) liquids stream 115 (or, preferably, pH-adjusted liquids stream 115') is fed into struvite reactor 124, as described above. A second relatively phosphorus-reduced and magnesium-reduced (P- & Mg-Poor) mixture 230 is fed into a digester 116 followed by a dewaterer or dewatering centrifuge 118 to produce an ammonia-rich liquids stream 122 that is also fed to struvite reactor 124. Phosphorus-reduced (P-reduced) biosolids are produced as another byproduct of the dewatering step. By separating the WAS into two separate, differentially concentrated streams containing phosphorus and magnesium, downstream so-called nuisance struvite production within digester 116 is minimized while concurrent struvite production within struvite reactor 124 is maximized.

Those of skill in the art will appreciate that further downstream treatment 232 within mainstream process 220a can be accomplished via precipitation, filtration, and disinfection (e.g. chlorination followed by de-chlorination) of the output of secondary clarifier 112b (some of which is returned to the input of EBPR aeration basin 112a, and some of which is detoured to the sidestream process 220b, as illustrated). Thus, the output of downstream treatment 232 is suitable for return to a river or other body of water is the mainstream output of the invented process and system while usable and potentially sellable struvite product, e.g. pelletized fertilizer, is the side-stream output of the invented process and system. Those of skill also will appreciate that other output of struvite reactor 124 can be recycled as shown to the plant influent stream in what may be thought of as a substantially "closed-loop" system 220.

For the embodiments, the struvite reactor can take any form that permits the combination of the phosphorus and magnesium with the ammonium, to form struvite, including a simple settling tank, where spontaneously precipitated struvite would form and settle for reuse as a raw material, a usable product such as fertilizer, or a waste product. In one preferred embodiment prilled struvite is formed by a method disclosed in International Publication Number WO 2005/077834 A1.

In a first preferred variant of either the MLSS or the WAS embodiment the diversion of magnesium from the anaerobic digester and the resulting reduced nuisance struvite formation protects process equipment and reduces operational costs. In a second preferred variant, magnesium is added to capture additional phosphorus, thereby causing the system to produce additional struvite and a waste stream with less phosphorus and ammonia to be recycled back to the wastewater plant for re-treatment. In addition, phosphorus and magnesium can be added to increase struvite production and reduce the amount of ammonia sent back for re-treatment.

The above description is intended to provide an example of one method and system that falls within the scope of the invention. Skilled persons will recognize that other methods and systems will also fall within the scope of the invention.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Accordingly, while the present invention has been shown and described with reference to the foregoing embodiments of the invented process and system, it will be apparent to those skilled in the art that other changes in form and detail may be made therein without departing from the spirit and scope of the invention as defined in the appended claims.

I claim:

1. A waste treatment process, comprising:
    (a) producing a first mixture of solids, microorganisms and liquid from waste water, and wherein said microorganisms contain phosphorus and magnesium;
    (b) removing phosphorus and magnesium from the microorganisms and permitting said removed phosphorus and magnesium to dissolve in a liquid portion of said first mixture, wherein said removing step includes adding readily biodegradable carbon compounds (RBCs) to said first mixture, thereby to produce a treated mixture that includes dissolved magnesium and phosphorus;
    (c) fermenting and thickening said treated mixture to produce a phosphorus-rich and magnesium-rich liquid that is separated from a remaining phosphorus-reduced and magnesium-reduced mixture;
    (d) further anaerobic treating said phosphorus-reduced and magnesium-reduced mixture, thereby creating an ammonia-rich, phosphorus-reduced and magnesium-reduced mixture;
    (e) dewatering said ammonia-rich mixture to produce ammonia-rich liquid; and
    (f) mixing said ammonia-rich liquid with said phosphorus-rich and magnesium-rich liquid, to produce struvite.

2. The process of claim 1, wherein step (b) is performed by holding said treated mixture in an anaerobic reactor for a defined period of time.

3. The process of claim 1, wherein the RBCs include volatile fatty acids (VFAs).

4. The process of claim 1, wherein the RBCs include compounds that are converted into volatile fatty acids (VFAs) by said microorganisms.

5. The process of claim 1, wherein said first mixture is waste activated sludge.

6. The process of claim 1, wherein said first mixture is mixed liquor suspended solids.

7. The process of claim 1, wherein step (b) is performed by passing said first mixture through an anaerobic zone, wherein volatile fatty acids are present which cause phosphorus and magnesium to be expelled from the microorganisms.

8. The process of claim 1, wherein step (b) is performed by retaining said first mixture in an anaerobic reactor for more than 36 hours.

9. The process of claim 1, wherein said step of mixing said magnesium and phosphorus-rich liquid with said ammonia-rich liquid is performed in a struvite reactor and wherein magnesium is added to said struvite reactor or any input thereto, thereby to increase production of struvite.

10. The process of claim 1, wherein said ammonia-rich liquid is mixed with said phosphorus-rich and magnesium-rich liquid in a manner that produces a usable struvite product.

11. The process of claim 1, wherein said phosphorus-reduced and magnesium-reduced mixture produced in step (c) is in the form of a sludge, and wherein step (d) is performed with said sludge produced in step (c) mixed with at least one other sludge from said waste treatment process.

12. The process of claim 1, wherein said steps (a), (b), (c), (d), (e). and (f) are performed in situ.

13. A struvite recovery system comprising:
    a primary clarifier for producing a primary sludge and an organic waste stream from sewage;
    a fermenter for fermenting organic waste in a wastewater stream to produce fermented sludge;
    a first thickener for thickening the fermented sludge, the fermenter and the first thickener collectively producing readily biodegradable carbon compounds (RBCs) from the organic waste in the wastewater stream;
    an aeration basin for reacting the RBCs from said first thickener with mixed liquor suspended solids (MLSS), the aeration basin output coupled with a secondary clarifier the output from which is waste-activated sludge (WAS);
    a separator operatively coupled with first thickener and with the secondary clarifier to produce a phosphorus-rich and magnesium-rich stream and a separate phosphorus-reduced and magnesium-reduced stream;
    a digester operatively coupled with the separator for digesting said phosphorus-reduced and magnesium-reduced stream with said fermented sludge;
    a dewaterer operatively coupled with the digester to produce phosphorus-reduced and magnesium-reduced but ammonia-rich stream; and a struvite reactor configured to react the ammonia-rich stream and the phosphorus-rich and magnesium-rich stream to produce struvite rich in ammonia, phosphorus, and magnesium.

14. The system of claim 13, wherein said struvite reactor is configured further to react ex situ sourced phosphorous and magnesium thereby to further reduce ammonia discharge from the reactor.

15. The system of claim 13 further comprising: a pH adjustment station upstream from said struvite reactor for adjusting the pH of the phosphorus-rich and magnesium-rich stream.

16. The system of claim 13 further comprising: a pH adjustment station in said struvite reactor for adjusting the pH of the contents of the struvite reactor.

17. The system of claim 13, wherein said fermenter and said first thickener are integrated into a unified fermenter and thickener (UFAT) unit.

18. The system of claim 13 which further comprises: a priller downstream from said struvite reactor configured to form a usable struvite product.

19. The system of claim 18, wherein the priller is configured to form the struvite into substantially regularly shaped and sized struvite pellets.

20. The system of claim 19 which is substantially operationally contained and maintained in situ, the only input to which is sewage and the only outputs from which are treated effluent and struvite pellets.

21. The system of claim 20 which further comprises: a treatment station downstream from said aeration basin and said secondary clarifier for treating output therefrom, said station performing one or more of the steps of removing inorganic pollutants, filtering, and disinfecting the output before it is released back into a natural environment.

22. The system of claim 13, wherein no industrial chemical is added for stripping phosphorus and magnesium from the organic waste water stream.

23. The system of claim 13, wherein one or more industrial chemicals is added for stripping phosphorus and magnesium from the organic waste water stream.

24. The system of claim 13, wherein said digester includes an inlet for inputting thereto the phosphorus-reduced and magnesium-reduced stream, and wherein said struvite reactor includes an inlet for inputting the phosphorus-rich and magnesium-rich stream.

25. The system of claim 13, wherein said separator includes a centrifuge or the like configured to separate the phosphorus-rich and magnesium-rich stream from the phosphorus-reduced and magnesium-reduced stream.

26. The system of claim 13, wherein said separator includes an anaerobic release tank upstream from and operatively coupled with a second thickener, and wherein said second thickener is configured to produce the phosphorous-rich and magnesium-rich stream.

27. The system of claim 26, wherein said second thickener includes a component chosen from a group consisting of a settling tank, a centrifuge, a thickening belt, and one or more rotating screens.

28. The system of claim 13, wherein said dewaterer includes a component chosen from a group consisting of a settling tank, a centrifuge, a thickening belt, and one or more rotating screens.

29. The system of claim 13, wherein said first thickener includes components chosen from a group consisting of a settling tank, a centrifuge, a thickening belt, and one or more rotating screens.

30. In a wastewater treatment process in which phosphorus is removed thereby, the improvement comprising:
adding one or more readily biodegradable carbon compounds (RBCs) including compounds convertible into one or more volatile fatty acids (VFAs) to a waste sidestream to dose stripping and removal from the waste sidestream of phosphorus and magnesium found therein; and
reacting the stripped and removed phosphorus and magnesium with ammonia to produce struvite.

31. The improvement of claim 30 further comprising: forming the one or more VFAs in situ with said adding and said reacting steps.

32. The improvement of claim 31, wherein the one or more VFAs react with microorganisms in the wastewater that contain phosphorus and magnesium to release the phosphorus and magnesium therefrom.

33. The improvement of claim 32, wherein said adding is of 3-8 grams of one or more VFAs for each gram of planned phosphorus and magnesium to be stripped and removed.

34. The improvement of claim 32 further comprising: prilling the struvite into a pelletized struvite product.

35. The improvement of claim 34, wherein said prilling step is performed in situ with said adding, said reacting, and said forming steps.

36. The improvement of claim 35 further comprising: separating the stripped and removed phosphorus and magnesium to form two separated streams including a first phosphorus-rich and magnesium-rich liquid stream and a second phosphorus-reduced and magnesium-reduced sludge stream prior to said reacting of said first phosphorus-rich and magnesium-rich liquid stream with said ammonia-rich liquid.

37. The improvement of claim 36, wherein said separating step is performed in situ with said adding said reacting, said forming, and said prilling steps.

* * * * *

UNITED STATES PATENT AND TRADEMARK OFFICE
CERTIFICATE OF CORRECTION

PATENT NO. : 8,496,827 B2
APPLICATION NO. : 12/451168
DATED : July 30, 2013
INVENTOR(S) : Robert Bauer It is certified that error appears in the above-identified patent and that said Letters Patent is hereby corrected as shown below:

In the Claims

Column 6:
  at line 43, replace "(e)." with --(e),--.

Signed and Sealed this
First Day of October, 2013

Teresa Stanek Rea
*Deputy Director of the United States Patent and Trademark Office*